US012794616B2

(12) United States Patent
Gao

(10) Patent No.: US 12,794,616 B2
(45) Date of Patent: Nov. 10, 2026

(54) CODE WORD LAYER MAPPING INDICATION METHOD AND APPARATUS, DEVICE, AND STORAGE MEDIUM

(71) Applicant: BEIJING XIAOMI MOBILE SOFTWARE CO., LTD., Beijing (CN)

(72) Inventor: Xueyuan Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 220 days.

(21) Appl. No.: 18/850,010

(22) PCT Filed: Mar. 30, 2022

(86) PCT No.: PCT/CN2022/084006
§ 371 (c)(1),
(2) Date: Sep. 23, 2024

(87) PCT Pub. No.: WO2023/184217
PCT Pub. Date: Oct. 5, 2023

(65) Prior Publication Data
US 2025/0226936 A1 Jul. 10, 2025

(51) Int. Cl.
*H04L 5/00* (2006.01)

(52) U.S. Cl.
CPC .................................. *H04L 5/0037* (2013.01)

(58) Field of Classification Search
CPC ... H04L 5/0037; H04L 1/0041; H04L 1/0075; H04L 1/06; H04B 7/0413
See application file for complete search history.

(56) References Cited

U.S. PATENT DOCUMENTS 10,425,934 B2 * 9/2019 Cai ...................... H04B 7/0413
2013/0195070 A1 * 8/2013 Bashar .................. H04L 5/0035 370/330
2021/0091831 A1 3/2021 Cao
2025/0141607 A1 * 5/2025 Lee ........................... H04L 1/18

FOREIGN PATENT DOCUMENTS

CN 110855329 A 2/2020
WO WO 2020060375 A1 3/2020

OTHER PUBLICATIONS

Sun, Yongqian, et al. "Hotspot: Anomaly localization for additive kpis with multi-dimensional attributes." IEEE Access 6 (2018): 10909-10923. (Year: 2018).*
PCT/CN2022/084006 International Search Report dated Dec. 8, 2022, 2 pages.
CMCC "Discussion on DL multi-TRP transmission" 3GPP TSG RAN WG1 Ad-Hoc Meeting 1901, R1-1900418, Jan. 2019, 5 pages.
European Patent Application No. 22934071.6, Search Report and Opinion dated Dec. 15, 2025, 11 pages.

* cited by examiner

*Primary Examiner* — Sharad Rampuria
(74) *Attorney, Agent, or Firm* — Cozen O'Connor

(57) ABSTRACT

A method for indicating layer mapping of a code word (CW), performed by a terminal, includes: determining and enabling a target layer mapping scheme, wherein the target layer mapping scheme comprises a Type-1 layer mapping scheme or a Type-2 layer mapping scheme; wherein a maximum value of difference between numbers of layers corresponding to two CWs after layer mapping based on the Type-1 layer mapping scheme is different from a maximum value of difference between numbers of layers corresponding to the two CWs after layer mapping based on the Type-2 layer mapping scheme.

19 Claims, 7 Drawing Sheets

CODE WORD LAYER MAPPING INDICATION METHOD AND APPARATUS, DEVICE, AND STORAGE MEDIUM

CROSS-REFERENCE TO RELATED APPLICATION

The present application is a U.S. national phase of International Application No. PCT/CN2022/084006, filed with the State Intellectual Property Office of P. R. China on Mar. 30, 2022, the contents of which are incorporated herein by reference in their entireties for all purposes.

TECHNICAL FIELD

The disclosure relates to a field of wireless communication technology, in particular to a method for indicating layer mapping of a code word, an apparatus for indicating layer mapping of a code word, a device and a storage medium.

BACKGROUND

A multiple-input multiple-output (MIMO) system is a wireless communication system that uses multiple transmitting antennas and multiple receiving antennas for data transmission.

During data transmission between a terminal and a network device, since the number of code words is inconsistent with the number of transmitting antennas, the code words need to be mapped to different data layers according to certain rules. For example, if the terminal has 4 transmitting antennas, a first code word of two code words is mapped to a transport layer 1 and a transport layer 2, and a second code word of the two code words is mapped to a transport layer 3 and a transport layer 4.

However, since a flexibility of the above mapping method is limited, a quality of data transmission may be poor in some scenarios. For example, the above mapping method may result in a performance loss when interlayer channel performance of each transport layer varies significantly.

SUMMARY

According to a first aspect of the disclosure, a method for indicating layer mapping of a CW is provided. The method includes:

- determining and enabling a target layer mapping scheme, in which the target layer mapping scheme is a Type-1 layer mapping scheme or a Type-2 layer mapping scheme;
- in which, a maximum value of difference between numbers of layers corresponding to two CWs after layer mapping based on the Type-1 layer mapping scheme is different from a maximum value of difference between numbers of layers corresponding to the two CWs after layer mapping based on the Type-2 layer mapping scheme.

According to a second aspect of the disclosure, a method for indicating layer mapping of a CW is provided. The method includes:

- sending indication information, in which the indication information is configured to instruct a terminal to determine and enable a target layer mapping scheme, and the target layer mapping scheme is a Type-1 layer mapping scheme or a Type-2 layer mapping scheme;
- in which, a maximum value of difference between numbers of layers corresponding to two CWs after layer mapping based on the Type-1 layer mapping scheme is different from a maximum value of difference between numbers of layers corresponding to the two CWs after layer mapping based on the Type-2 layer mapping scheme.

According to a third aspect of the disclosure, a terminal device including: a processor, a transceiver connected to the processor, and a memory for storing instructions executable by the processor is provided. The processor is configured to load and execute the executable instructions to implement the method for indicating layer mapping of the CW as described above.

According to a fourth aspect of the disclosure, a network device including: a processor, a transceiver connected to the processor, and a memory for storing instructions executable by the processor is provided. The processor is configured to load and execute the executable instructions to implement the method for indicating layer mapping of the CW as described above.

According to a fifth aspect of the disclosure, a non-transitory computer-readable storage medium having executable instructions stored thereon is provided. The executable instructions are loaded and executed by a processor to implement the method for indicating layer mapping of the CW as described above.

BRIEF DESCRIPTION OF THE DRAWINGS

In order to clearly illustrate technical solutions of embodiments of the disclosure, a brief description of drawings used in embodiments is given below. Obviously, the drawings in the following descriptions are only part of the embodiments of the disclosure, and for those skilled in the art, other drawings can be obtained according to these drawings without inventive work.

DETAILED DESCRIPTION

In order to make the objectives, technical solutions and advantages of the disclosure more clear, the implementations of the disclosure will be further described in detail below with reference to the accompanying drawings.

The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the embodiments of the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It is understandable that although the terms "first", "second", and "third" may be used in the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

For the purposes of brevity and ease of understanding, the terms "greater than" and "less than" are used herein to represent size relationships. Those skilled in the art understand that the term "greater than" also covers the meaning of "greater than or equal to", and the term "less than" also covers the meaning of "less than or equal to".

Before describing the method for indicating layer mapping of a code word (CW) according to the embodiments of the disclosure in detail, the mobile communication system involved in the embodiments of the disclosure is briefly described.

Figure 1:
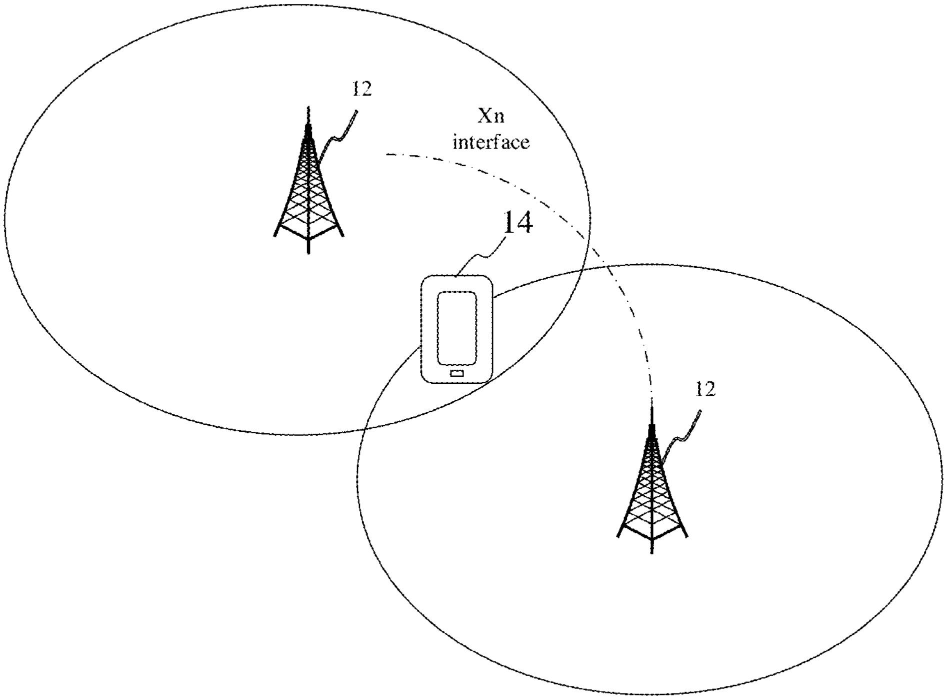
FIG. 1 is a schematic diagram of a communication system according to an exemplary embodiment of the disclosure.

FIG. 1 illustrates a block diagram of a communication system according to an exemplary embodiment of the disclosure. The communication system may include: a network device 12 and a terminal 14.

The network device 12 may be a base station, which is a device deployed in an access network to provide wireless communication functions for the terminal. The base station may include various forms of macro base stations, micro base stations, relay stations, access points, etc. In systems using different radio access technologies, the name of the device with the functions of the base station may be different. For example, in a long term evolution (LTE) system, the device is called eNodeB (eNB), but in a 5G NR-U systems, the device is called gNodeB (gNB). As communication technologies evolve, the description of "base station" may also change. For the convenience of description in the embodiments of the disclosure, the above-mentioned devices that provide wireless communication functions for the terminal 14 are collectively referred to as network device. Optionally, a communication interface between the network devices 12 is an Xn interface.

The terminal 14 may include a variety of handheld devices, in-vehicle devices, wearable devices, computing devices, or other processing devices connected to a wireless modem, as well as various forms of user equipments, such as mobile station (MS), terminal device, and the like. For ease of description, the devices mentioned above are collectively referred to as terminal. The network device 12 and the terminal 14 communicate with each other via an air interface, such as a Uu interface. Optionally, the terminal 14 supports small data transmission in an inactive state.

The technical solutions of the embodiments of the disclosure can be applied to various kinds of communication systems, e.g., a Global System of Mobile Communication (GSM) system, a Code Division Multiple Access (CDMA) system, a Wideband CDMA (WCDMA) system, a General Packet Radio Service (GPRS) system, a LTE system, a LTE Frequency Division Duplex (FDD) system, a LTE Time Division Duplex (TDD) system, an Advanced Long Term Evolution (LTE-A) system, a New Radio (NR) system, an evolved system of the NR system, a LTE-based access to Unlicensed spectrum (LTE-U) system, a NR-U system, a Universal Mobile Telecommunication System (UMTS), a Worldwide Interoperability for Microwave Access (WiMAX) communication system, a Wireless Local Area Networks (WLAN), Wireless Fidelity (WiFi), a next generation communication system or other communication systems, etc.

Generally, traditional communication systems support a limited number of connections and are easy to implement. However, with the development of communication technologies, mobile communication systems will not only support traditional communications, but also support, for example, Device to Device (D2D) communication, Machine to Machine (M2M) communication, Machine Type Communication (MTC), Vehicle to Vehicle (V2V) communication, and Vehicle to Everything (V2X) system. Embodiments of the disclosure may also be applied to these communication systems.

Figure 2:
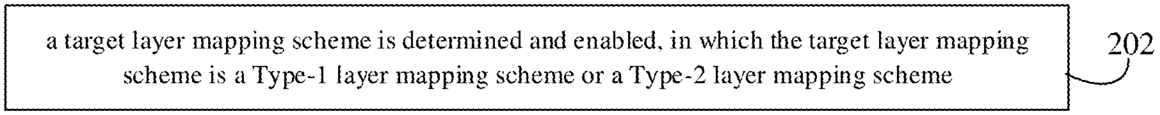
FIG. 2 is a flowchart of a method for indicating layer mapping of a code word (CW) according to an exemplary embodiment of the disclosure.

FIG. 2 illustrates a flowchart of a method for indicating layer mapping of a CW according to an exemplary embodiment of the disclosure. The method includes the following steps.

At step 202, a target layer mapping scheme is determined and enabled, in which the target layer mapping scheme is a Type-1 layer mapping scheme or a Type-2 layer mapping scheme.

For example, in an uplink or a downlink, the target layer mapping scheme is determined and enabled/activated/supported. That is, in the uplink, the terminal determines and enables the Type-1 layer mapping scheme or the Type-2 layer mapping scheme. In the downlink, the network device determines and enables the Type-1 layer mapping scheme or the Type-2 layer mapping scheme. The embodiment of the disclosure is illustrated using the uplink as an example.

The Type-1 layer mapping scheme refers to one scheme for mapping the CWs to a single transport layer or a plurality of transport layers.

The Type-2 layer mapping scheme refers to another scheme for mapping the CWs to a single transport layer or a plurality of transport layers.

It is able to understand that the Type-1 layer mapping scheme and the Type-2 layer mapping scheme represent different layer mapping schemes, and names of the layer mapping schemes are not specifically limited in the embodiments of the disclosure.

The CW is data that originates from a same information bit block and undergoes channel coding.

Layer mapping refers to a mechanism for allocating the CW to a specific transport layer, which may also be referred to as "CW-to-layer mapping" or "CW-layer mapping".

It is able to understand that layer mapping may be a "CW-to-layer mapping" process for the terminal to determine the uplink, or a "CW-to-layer mapping" process for the network device to determine the downlink, which is not limited in the embodiments of the disclosure.

For example, a maximum value of difference between numbers of layers corresponding to two CWs after layer mapping based on the Type-1 layer mapping scheme is different from a maximum value of difference between numbers of layers corresponding to the two CWs after layer mapping based on the Type-2 layer mapping scheme. For example, the two CWs include a first CW and a second CW, the first CW, after the layer mapping, corresponds to a first number of layers, and the second CW, after the layer mapping, corresponds to a second number of layers.

With the Type-1 layer mapping scheme, the difference between the first number of layers and the second number of layers is 0 or 1.

With the Type-2 layer mapping scheme, the maximum value of the difference between the first number of layers and the second number of layers may be any value from 0 to 6. For example, in the uplink, the two CWs correspond to a maximum of eight transport layers. In the embodiment, eight transport layers are illustrated herein as an example. In a case where the terminal determines and enables the Type-1 layer mapping scheme, the first CW is mapped to layers 1 to 4, and the second CW is mapped to layers 5 to 8. That is, the first CW is allocated to the layers 1 to 4, and the second CW is allocated to the layers 5 to 8, and each of the two CWs is mapped to four transport layers, and the difference between the numbers of layers corresponding to the two CWs is 0.

In a case where the terminal determines and enables the Type-2 layer mapping scheme, the first CW is mapped to layers 1 to 2, and the second CW is mapped to layers 3 to 8. That is, the first CW is allocated to the layers 1 to 2, and the second CW is allocated to the layers 3 to 8, the first CW is mapped to two transport layers, the second CW is mapped to six transport layers, and the difference between the numbers of layers corresponding to the two CWs is 4.

In conclusion, according to the technical solutions provided by the embodiments of the disclosure, the Type-1 layer mapping scheme or the Type-2 layer mapping scheme is determined and enabled. The Type-2 layer mapping scheme provided by the disclosure may flexibly configure the number of layers corresponding to each CW after mapping, which may ensure a quality of data transmission between the terminal and the network device in a case of a larger interlayer channel performance difference.

The Type-1 layer mapping scheme and the Type-2 layer mapping scheme are exemplarily introduced below. The Type-1 layer mapping scheme and the Type-2 layer mapping scheme may be used for both the uplink and the downlink.

Figure 3:
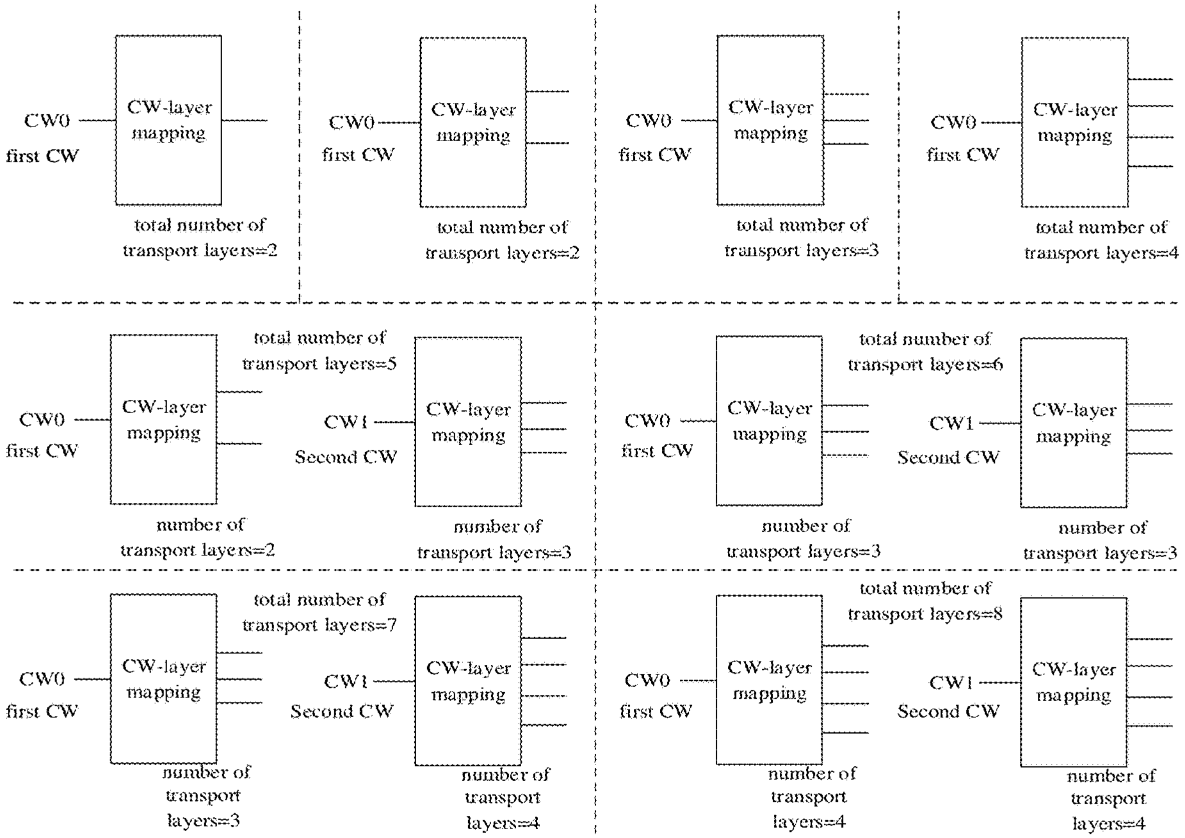
FIG. 3 is a schematic diagram of a Type-1 layer mapping scheme according to an exemplary embodiment of the disclosure.

Type-1 Layer Mapping Scheme:

Assuming that the maximum value of a total number of transport layers is eight, as illustrated in FIG. 3, the Type-1 layer mapping scheme includes eight layer mapping schemes corresponding to one CW and two CWs. Based on the Type-1 layer mapping scheme, the number of transport layers corresponding to one CW after layer mapping is greater than 0 and less than or equal to 4. Assuming that the two CWs include a first CW and a second CW, the first CW, after layer mapping, corresponds to a first number of layers, and the second CW, after layer mapping, corresponds to a second number of layers. Under the Type-1 layer mapping scheme, the difference between the first number of layers and the second number of layers is 0 or 1, and a sum of the first number of layers and the second number of layers is greater than 4, and less than or equal to 8. For example, the Type-1 layer mapping scheme corresponding to one CW (including CW0).

CW0 is mapped to one transport layer;

for example, the CW0 is mapped to transport layer 1, and a total number of transport layers is 1.

CW0 is mapped to two transport layers;

for example, the CW0 is mapped to transport layers 1 and 2, and a total number of transport layers is 2.

CW0 is mapped to three transport layers;

for example, the CW0 is mapped to transport layers 1-3, and a total number of transport layers is 3.

CW0 is mapped to four transport layers;

for example, the CW0 is mapped to transport layers 1-4, and a total number of transport layers is 4.

The Type-1 layer mapping scheme corresponding to two CWs (including CW0 and CW1) includes four schemes below.

CW0 is mapped to two transport layers, and CW1 is mapped to three transport layers;

for example, the CW0 is mapped to transport layers 1 and 2, the CW1 is mapped to transport layers 3-5, and a total number of transport layers is 5.

CW0 is mapped to three transport layers, and CW1 is mapped to three transport layers;

for example, the CW0 is mapped to transport layers 1-3, the CW1 is mapped to transport layers 4-6, and a total number of transport layers is 6.

CW0 is mapped to three transport layers, and CW1 is mapped to four transport layers;

for example, the CW0 is mapped to transport layers 1-3, the CW1 is mapped to transport layers 4-7, and a total number of transport layers is 7.

CW0 is mapped to 4 transport layers, and CW1 is mapped to 4 transport layers;

For example, CW0 is mapped to transport layers 1-4, CW1 is mapped to transport layers 5-8, and a total number of transport layers is 8.

Figure 4:
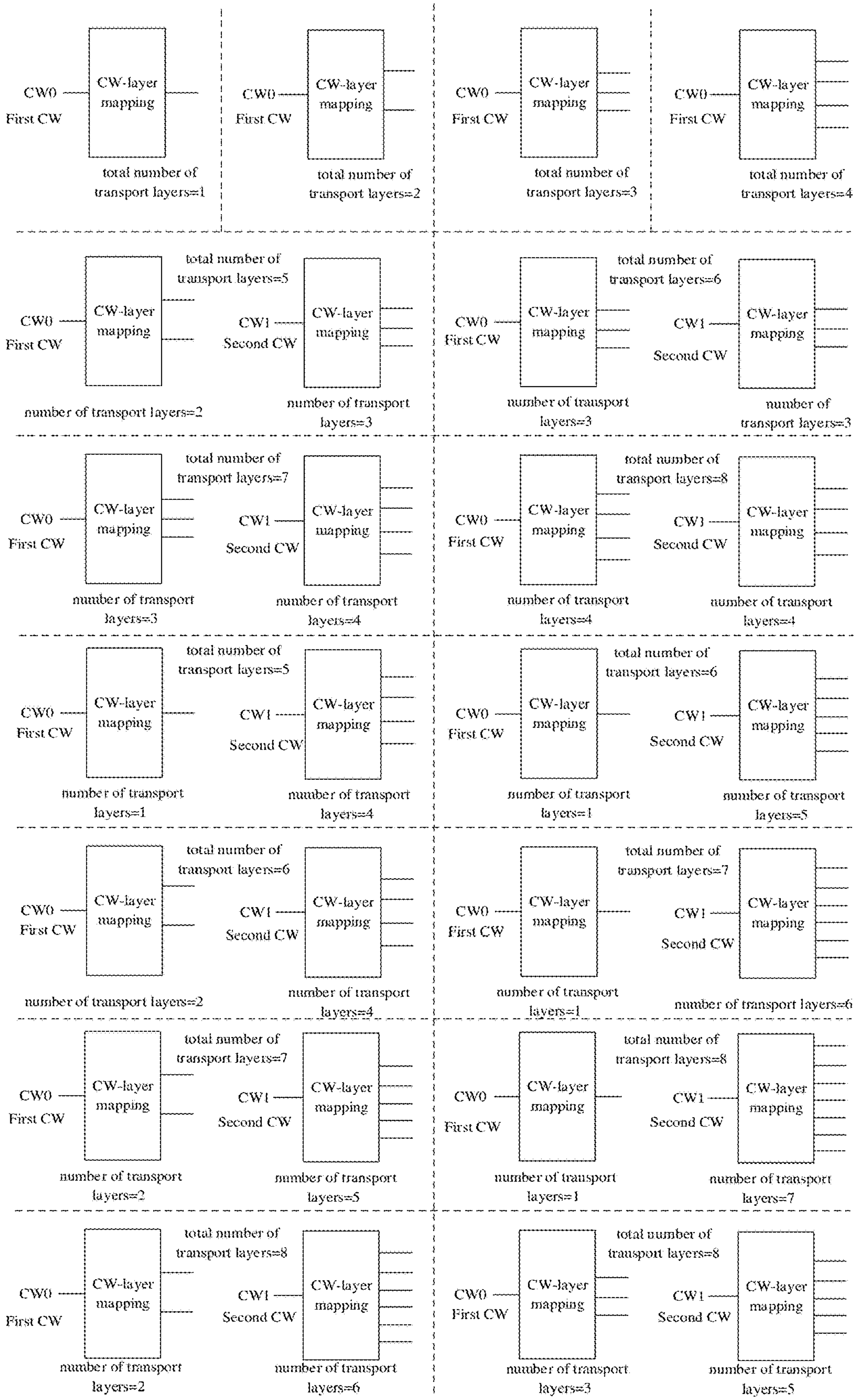
FIG. 4 is a schematic diagram of a Type-2 layer mapping scheme according to an exemplary embodiment of the disclosure.

Type-2 Layer Mapping Scheme:

Assuming that the maximum value of a total number of transport layers is eight, as illustrated in FIG. 4, the Type-2 layer mapping scheme includes 16 layer mapping schemes corresponding to one CW and two CWs. Based on the Type-2 layer mapping scheme, the number of transport layers corresponding to one CW after layer mapping is greater than 0, and less than or equal to 4.

For example, as illustrated in FIG. 4, the Type-2 layer mapping scheme corresponding to one CW (including CW0) includes four schemes below.

CW0 is mapped to one transport layer;

for example, the CW0 is mapped to transport layer 1, and a total number of transport layers is 1.

CW0 is mapped to two transport layers;

for example, the CW0 is mapped to transport layers 1 and 2, and a total number of transport layers is 2.

CW0 is mapped to three transport layers;

for example, the CW0 is mapped to transport layers 1-3, and a total number of transport layers is 3.

CW0 is mapped to 4 transport layers;

for example, the CW0 is mapped to transport layers 1-4, and a total number of transport layers is 4.

The two CWs include a first CW and a second CW, the first CW, after the layer mapping, corresponds to a first number of layers, and the second CW, after the layer mapping, corresponds to a second number of layers. Based on the Type-2 layer mapping scheme, a maximum difference between the first number of layers and the second number of layers is allowed to be greater than 1, and a sum of the first number of layers and the second number of layers is greater than 1, and less than or equal to 8.

From the description of the above Type-1 layer mapping scheme, it can be seen that the difference between the first number of layers and the second number of layers, in the Type-1 layer mapping scheme, is 0 or 1, and the maximum difference between the first number of layers and the second number of layers, in the Type-2 layer mapping scheme, is allowed to be greater than 1. Thus the Type-2 layer mapping scheme is more flexible than the Type-1 layer mapping scheme. Taking the maximum value of the total number of transport layers as eight as an example, the difference between the first number of layers and the second number of layers, in the Type-2 layer mapping scheme, may be any integer from 0 to 6. For example, the CW0 is mapped to transport layer 1, the CW1 is mapped to transport layers 2-7, the total number of transport layers is eight, and the difference between the first number of layers and the second number of layers is six.

Optionally, the Type-2 layer mapping scheme includes at least one of the following schemes:

supporting to transmit the two CWs for a transmission with 5 to 8 transport layers;

or, supporting to transmit the two CWs for a transmission with 4 or more transport layers;

or, supporting to transmit the two CWs for a transmission with 2 or more transport layers.

The followings are schemes, in the Type-2 layer mapping scheme, which support to transmit the two CWs for the transmission with 5 to 8 layers.

As illustrated in FIG. 4, in a case where the Type-2 layer mapping scheme supports to transmit the two CWs for the transmission with 5 to 8 layer, the Type-2 layer mapping schemes corresponding to the two CWs (including CW0 and CW1) includes twelve schemes below.

CW0 is mapped to one transport layer, and CW1 is mapped to four transport layers;

for example, the CW0 is mapped to transport layer 1, the CW1 is mapped to transport layers 2-5, and a total number of transport layers is 5.

CW0 is mapped to two transport layers, and CW1 is mapped to three transport layers;

for example, the CW0 is mapped to transport layers 1 and 2, the CW1 is mapped to transport layers 3-5, and a total number of transport layers is 5.

CW0 is mapped to one transport layer, and CW1 is mapped to five transport layers;

for example, the CW0 is mapped to transport layer 1, the CW1 is mapped to transport layers 2-6, and a total number of transport layers is 6.

CW0 is mapped to two transport layers, and CW1 is mapped to four transport layers;

for example, the CW0 is mapped to transport layers 1 and 2, the CW1 is mapped to transport layers 3-6, and a total number of transport layers is 6.

CW0 is mapped to three transport layers, and CW1 is mapped to three transport layers;

for example, the CW0 is mapped to transport layers 1-3, the CW1 is mapped to transport layers 4-6, and a total number of transport layers is 6.

CW0 is mapped to one transport layer, and CW1 is mapped to six transport layers;

for example, the CW0 is mapped to transport layer 1, the CW1 is mapped to transport layers 2-7, and a total number of transport layers is 7.

CW0 is mapped to two transport layers, and CW1 is mapped to five transport layers;

for example, the CW0 is mapped to transport layers 1 and 2, the CW1 is mapped to transport layers 3-7, and a total number of transport layers is 7.

CW0 is mapped to three transport layers, and CW1 is mapped to four transport layers;

for example, the CW0 is mapped to transport layers 1-3, the CW1 is mapped to transport layers 4-7, and a total number of transport layers is 7.

CW0 is mapped to one transport layer, and CW1 is mapped to seven transport layers;

for example, the CW0 is mapped to transport layer 1, the CW1 is mapped to transport layers 2-8, and a total number of transport layers is 8.

CW0 is mapped to two transport layers, and CW1 is mapped to six transport layers;

for example, the CW0 is mapped to transport layers 1 and 2, the CW1 is mapped to transport layers 3-8, and a total number of transport layers is 8.

CW0 is mapped to three transport layers, and CW1 is mapped to five transport layers;

for example, the CW0 is mapped to transport layers 1-3, the CW1 is mapped to transport layers 4-8, and a total number of transport layers is 8.

CW0 is mapped to four transport layers, and CW1 is mapped to four transport layers;

for example, the CW0 is mapped to transport layers 1-4, the CW1 is mapped to transport layers 5-8, and a total number of transport layers is 8.

The followings are schemes, in the Type-2 layer mapping scheme, which support to transmit the two CWs for the transmission with 4 or more layers.

Figure 5:
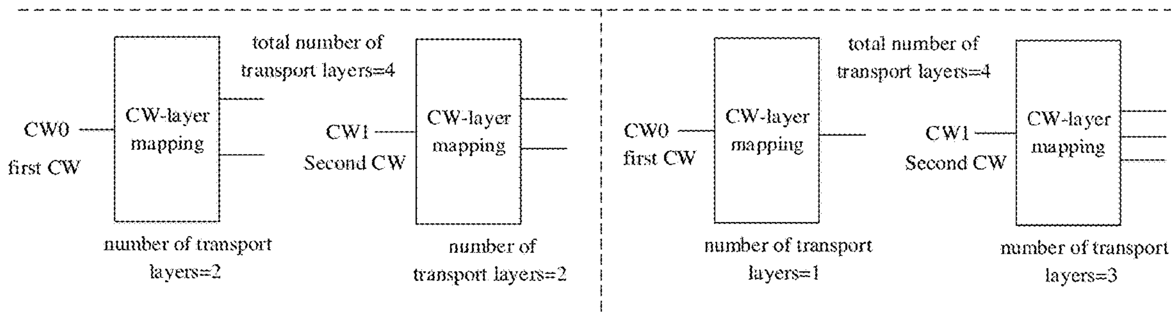
FIG. 5 is a schematic diagram of a Type-2 layer mapping scheme according to an exemplary embodiment of the disclosure.

As illustrated in FIG. 5, in a case where the Type-2 layer mapping scheme supports to transmit the two CWs for the transmission with more than 4 or more transport layers, the Type-2 layer mapping scheme corresponding to the two CWs (including CW0 and CW1) may further include two schemes below, based on the FIG. 4.

CW0 is mapped to one transport layer, and CW1 is mapped to three transport layers;

for example, the CW0 is mapped to transport layer 1, the CW1 is mapped to transport layers 2-4, and a total number of transport layers is 4.

CW0 is mapped to two transport layers, and CW1 is mapped to two transport layers;

for example, the CW0 is mapped to transport layers 1 and 2, the CW1 is mapped to transport layers 3 and 4, and a total number of transport layers is 4.

The followings are schemes, in the Type-2 layer mapping scheme, which support to transmit the two CWs for the transmission with 2 or more layers.

Figure 6:
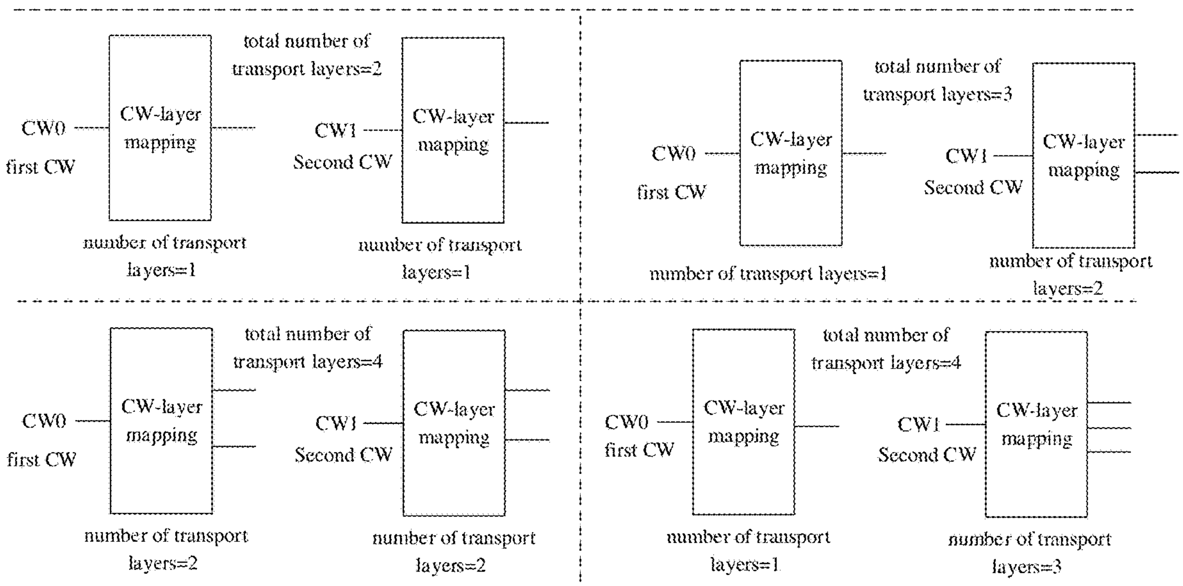
FIG. 6 is a schematic diagram of a Type-2 layer mapping scheme according to an exemplary embodiment of the disclosure.

As illustrated in FIG. 6, in a case where the Type-2 layer mapping scheme supports to transmit the two CWs for the transmission with 2 or more layers, the Type-2 layer mapping scheme corresponding to the two CWs (including CW0 and CW1) may further include four schemes below, based on the FIG. 4.

CW0 is mapped to 1 transport layer, and CW1 is mapped to 1 transport layer;

For example, CW0 is mapped to transport layer 1, CW1 is mapped to transport layer 2, and a total number of transport layers is 2.

CW0 is mapped to one transport layer, and CW1 is mapped to two transport layers;

for example, the CW0 is mapped to transport layer 1, the CW1 is mapped to transport layers 2 and 3, and a total number of transport layers is 3.

CW0 is mapped to one transport layer, and CW1 is mapped to three transport layers;

for example, the CW0 is mapped to transport layer 1, the CW1 is mapped to transport layers 2-4, and a total number of transport layers is 4.

CW0 is mapped to two transport layers, and CW1 is mapped to two transport layers;

for example, the CW0 is mapped to transport layers 1 and 2, the CW1 is mapped to transport layers 3 and 4, and a total number of transport layers is 4.

As an example, a maximum value of a total number of transport layers in the uplink is eight, and the layer mapping scheme for the uplink is described exemplarily in the following.

Type-1 Layer Mapping Scheme:

Based on the Type-1 layer mapping scheme, the difference between the first number of layers and the second number of layers is 0 or 1.

For example, when the terminal enables the Type-1 layer mapping scheme, the difference between numbers of layers corresponding to the two CWs, after layer mapping based on the Type-1 layer mapping scheme, is 0 or 1. The two CWs include a first CW and a second CW, the first CW corresponds to a first number of layers after the layer mapping, and the second CW corresponds to a second number of layers after the layer mapping.

Figure 7:
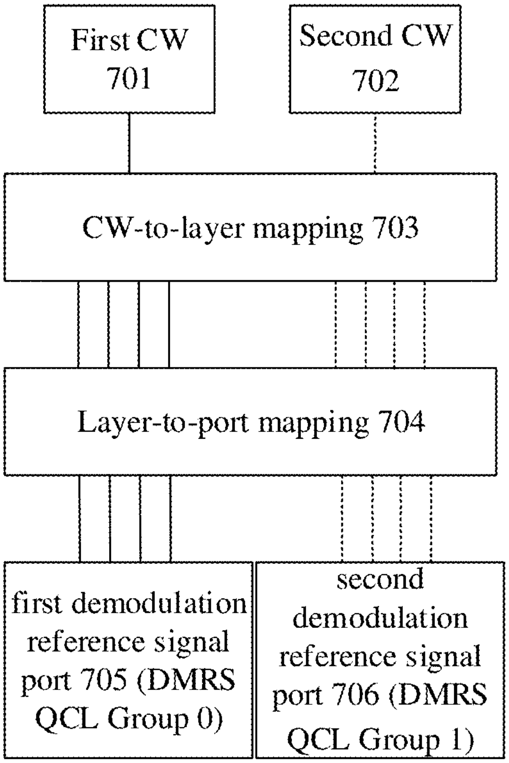
FIG. 7 is a flowchart of a method for indicating layer mapping of a CW according to an exemplary embodiment of the disclosure.

For example, as illustrated in FIG. 7, in the uplink, a first CW 701 and a second CW 702 correspond to a total of eight transport layers. In the case where the terminal determines and enables the Type-1 layer mapping scheme, the first CW 701 and the second CW 702 are subjected to CW-to-layer mapping 703. The first CW 701 is mapped to layers 1 to 4, and the second CW 702 is mapped to layers 5 to 8. That is, the first number of layers corresponding to the first CW 701 is four, the second number of layers corresponding to the second CW 702 is four, and the difference between the first number of layers and the second number of layers is 0. The data corresponding to each layer is subjected to layer-to-port mapping 704 and is mapped to different antenna ports. That is, the data of the layers 1 to 4 corresponding to the first CW 701 is mapped to a first demodulation reference signal port 705 (DMRS QCL Group 0) by precoding, and the data of the layers 5 to 8 corresponding to the second CW 702 is mapped to a second demodulation reference signal port 706 (DMRS QCL Group 1) by precoding.

It is understood that the first CW 901 is mapped to the layers 1 to 4, and the second CW 902 is mapped to the layers 5 to 8, which only means that the first CW 901 is mapped to four layers. For example, the first CW 901 can be mapped to layers 1, 3, 5, and 7. The specific layers in the four layers are not limited in the embodiments of the disclosure.

Figure 8:
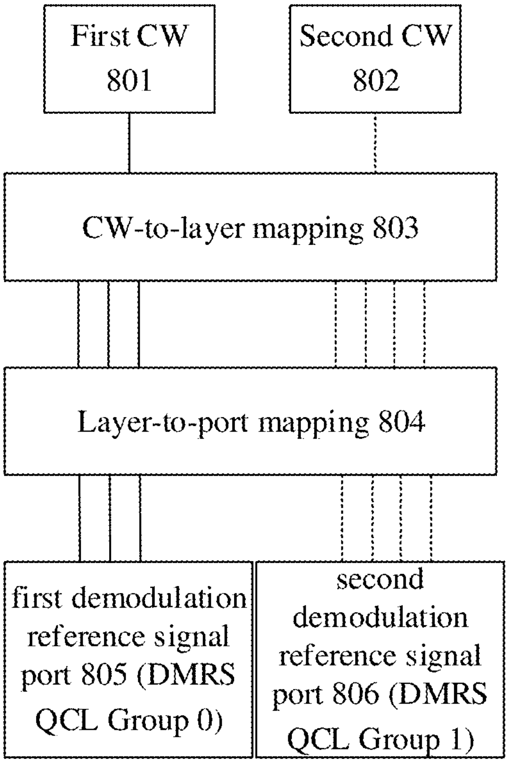
FIG. 8 is a flowchart of a method for indicating layer mapping of a CW according to an exemplary embodiment of the disclosure.

For example, as illustrated in FIG. 8, in the uplink, the first CW 801 and the second CW 802 correspond to a total of seven transport layers. In the case where the terminal determines and enables the Type-1 layer mapping scheme, the first CW 801 and the second CW 802 are subjected to CW-to-layer mapping 803. The first CW 801 is mapped to layers 1 to 3, and the second CW 802 is mapped to layers 4 to 7. That is, the first number of layers corresponding to the first CW 801 is three, the second number of layers corresponding to the second CW 802 is four, and the difference between the first number of layers and the second number of layers is 1. The data corresponding to each layer is subjected to layer-to-port mapping 804 and is mapped to different antenna ports. That is, the data of the layers 1 to 3 corresponding to the first CW 801 is mapped to a first demodulation reference signal port 805 (DMRS QCL Group 0) by precoding, and the data of the layers 4 to 7 corresponding to the second CW 802 is mapped to a second demodulation reference signal port 806 (DMRS QCL Group 1) by precoding.

Type-2 Layer Mapping Scheme:

Based on the Type-2 layer mapping scheme, the maximum value of the difference between the first number of layers and the second number of layers may be any value from 0 to 6.

Optionally, based on the Type-2 layer mapping scheme, the maximum value of the difference between the first number of layers and the second number of layers may be any value from 2 to 6.

For example, the terminal enables the Type-2 layer mapping scheme. The maximum value of the difference between numbers of layers corresponding to the two CWs, after layer mapping based on the Type-2 layer mapping scheme, may be any value from 0 to 6. The two CWs include a first CW and a second CW, the first CW corresponds to a first number of layers after the layer mapping, and the second CW corresponds to a second number of layers after the layer mapping. Based on the Type-2 layer mapping scheme, the maximum value of the difference between the first number of layers and the second number of layers may be any value from 0 to 6.

Optionally, based on the Type-2 layer mapping scheme, the difference between the first number of layers and the second number of layers may be any integer from 0 to 6, which is not limited in the embodiments of the disclosure.

Optionally, in the case where a maximum value of a total number of transport layers is eight (transport layers 1 to 8), the Type-2 layer mapping scheme includes at least one of the following schemes:

supporting to transmit the two CWs for a transmission with 5 to 8 transport layers;

or, supporting to transmit the two CWs for a transmission with 4 or more transport layers;

or, supporting to transmit the two CWs for a transmission with 2 or more transport layers.

Figure 9:
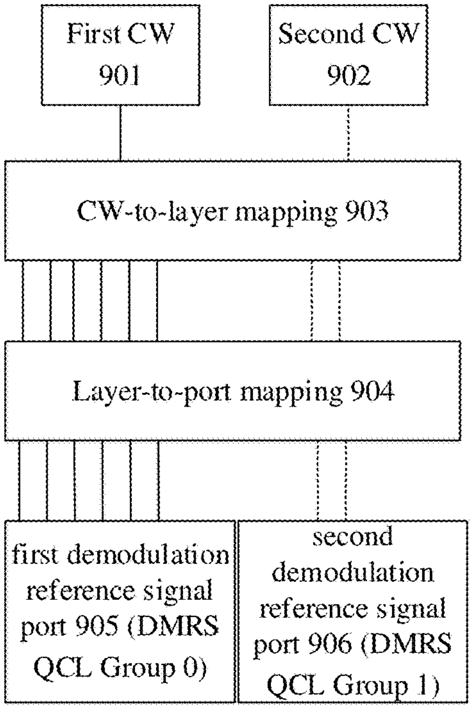
FIG. 9 is a flowchart of a method for indicating layer mapping of a CW according to an exemplary embodiment of the disclosure.

For example, as shown in FIG. 9, in the uplink, a first CW 901 and a second CW 902 correspond to a total of eight transport layers. In the case where the terminal determines and enables the Type-2 layer mapping scheme, the first CW 901 and the second CW 902 are subjected to CW-to-layer mapping 903. The first CW 901 is mapped to layers 1 to 6, and the second CW 902 is mapped to layers 7 and 8. That is, the first number of layers corresponding to the first CW 901 is six, the second number of layers corresponding to the second CW 902 is two, and the difference between the first number of layers and the second number of layers is 4. The data corresponding to each layer is subjected to layer-to-port mapping 904 and is mapped to different antenna ports. That is, the data of the layers 1-6 corresponding to the first CW 901 is mapped to a first demodulation reference signal port 905 (DMRS QCL Group 0) by precoding, and the data of layers 7 to 8 corresponding to the second CW 902 is mapped to a second demodulation reference signal port 906 (DMRS QCL Group 1) by precoding.

It is understood that in the case where the terminal determines and enables the Type-2 layer mapping scheme, the difference between the first number of layers and the second number of layers may be any integer from 0 to 6, which may include at least one of the following cases.

In case 1, the first CW 901 is mapped to layer 1, and the second CW 902 is mapped to layers 2-8.

In case 2, the first CW 901 is mapped to layers 1 and 2, and the second CW 902 is mapped to layers 3-8.

In case 3, the first CW 901 is mapped to layers 1-3, and the second CW 902 is mapped to layers 4-8.

In case 4, the first CW 901 is mapped to layers 1-4, and the second CW 902 is mapped to layers 5-8.

In case 5, the first CW 901 is mapped to layers 1-5, and the second CW 902 is mapped to layers 6-8.

In case 6, the first CW 901 is mapped to layers 1-6, and the second CW 902 is mapped to layers 7-8.

In case 7, the first CW 901 is mapped to layers 1-7, and the second CW 902 is mapped to layer 8.

In the case where the terminal determines and enables the Type-2 layer mapping scheme, the CW-to-layer mapping process of the first CW 901 and the second CW 902 can be referred to the above embodiments and will not be repeated herein.

The terminal determines and enables the target layer mapping scheme by a default rule.

Figure 10:
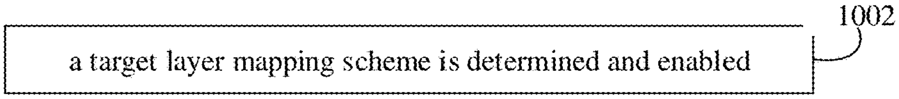
FIG. 10 is a flowchart of a method for indicating layer mapping of a CW according to an exemplary embodiment of the disclosure.

FIG. 10 is a flowchart of a method for indicating layer mapping of a CW according to an exemplary embodiment of the disclosure. In the embodiment, the method is applied to a terminal. The method includes the following step.

At step 1002, a target layer mapping scheme is determined and enabled.

The target layer mapping scheme is a Type-1 layer mapping scheme or a Type-2 layer mapping scheme.

For example, the embodiments of the disclosure are illustrated by taking an uplink as an example, in the uplink, the terminal determines and enables/activates/supports the target layer mapping scheme. That is, the terminal determines and enables the Type-1 layer mapping scheme or the Type-2 layer mapping scheme.

In a possible implementation, for the terminal, determining and enabling the target layer mapping scheme, includes at least one of the following:

- the terminal enabling the Type-1 layer mapping scheme by default;
- the terminal enabling the Type-2 layer mapping scheme by default;
- in a case where the terminal supports the Type-2 layer mapping scheme, enabling the Type-2 layer mapping scheme;
- for a single transmission and reception point (STRP) transmission, enabling the Type-1 layer mapping scheme;
- for an STRP transmission with a total number of layers ranging from 1 to 4, enabling the Type-1 layer mapping scheme; and for an STRP transmission with a total number of layers ranging from 5 to 8, enabling the Type-2 layer mapping scheme;
- for an STRP transmission with a total number of layers of 1, enabling the Type-1 layer mapping scheme; and for an STRP transmission with a total number of layers ranging from 2 to 8, enabling the Type-2 layer mapping scheme; or
- for a multi-transmission and reception point (MTRP) transmission, enabling the Type-2 layer mapping scheme.

The STRP may also be referred to as "single-TRP", and the MTRP may also be referred to as "multi-TRP", which is not limited in the disclosure.

It is understood that the cases in which the terminal determines and enables the target layer mapping scheme are not limited to the above cases, and the layer mapping schemes can be combined arbitrarily, which are not limited in the embodiments of the disclosure.

For example, for a terminal supporting the Type-2 layer mapping scheme, the terminal enables the layer mapping scheme of Type-2 by default.

In conclusion, the technical solutions provided by the embodiments of the disclosure illustrate a variety of cases in which the terminal determines and enables the Type-1 layer mapping scheme or the Type-2 layer mapping scheme by the default rule. The Type-2 layer mapping scheme provided by the disclosure may flexibly configure the number of layers corresponding to each CW after mapping, which makes it possible to ensure a quality of data transmission between the terminal and the network device even in a case of a larger interlayer channel performance difference.

The terminal determines and enables the target layer mapping scheme according to indication information of a network device.

Figure 11:
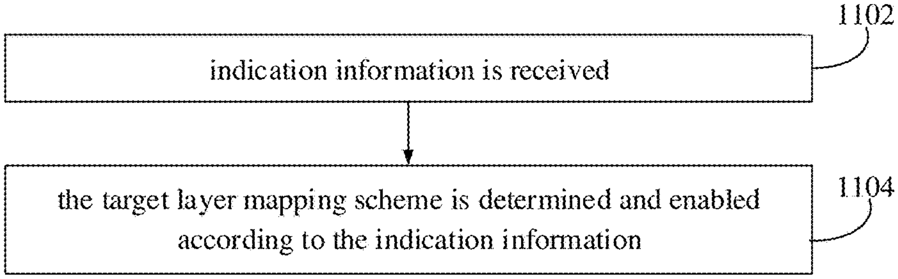
FIG. 11 is a flowchart of a method for indicating layer mapping of a CW according to an exemplary embodiment of the disclosure.

FIG. 11 is a flowchart of a method for indicating layer mapping of a CW according to an exemplary embodiment of the disclosure. In the embodiment, the method is applied to a terminal. The method includes the following step.

At step 1102, indication information is received.

For example, the terminal receives the indication information sent by the network device. The indication information is configured to instruct the terminal to determine and enable a target mapping scheme.

The target layer mapping scheme is a Type-1 layer mapping scheme or a Type-2 layer mapping scheme.

For example, in an uplink or a downlink, the terminal determines and enables/activates/supports the target layer mapping scheme. That is, the terminal determines and enables the Type-1 layer mapping scheme or the Type-2 layer mapping scheme. The embodiment of the disclosure takes the uplink as an example.

A maximum value of difference between numbers of layers corresponding to two CWs after layer mapping based on the Type-1 layer mapping scheme is different from a maximum value of difference between numbers of layers corresponding to the two CWs after layer mapping based on the Type-2 layer mapping scheme. For example, the two CWs include a first CW and a second CW, the first CW corresponds to a first number of layers after the layer mapping, and the second CW corresponds to a second number of layers after the layer mapping;

the difference between the first number of layers and the second number of layers, based on the Type-1 layer mapping scheme, is 0 or 1; and the maximum value of the difference between the first number of layers and the second number of layers, based on the Type-2 layer mapping scheme, is any value from 0 to 6.

In a possible implementation, the terminal receives the indication information sent by the network device. The indication information is carried in at least one of the following signaling:

a radio resource control (RRC) signaling;

a media access control control element (MAC CE) signaling;

a downlink control information (DCI) signaling; or a group control-DCI (GC-DCI) signaling. There may be other signaling, which are not limited in the embodiments of the disclosure.

In a possible implementation, the terminal receives the indication information sent by the network device. If the indication information is carried in the DCI signaling or the GC-DCI signaling, the indication information is carried in at least one of the following information fields of the DCI signaling or GC-DCI signaling:

an STRP and MTRP transmission switching dynamic indication field;

or, a newly added indication field;

or, a code point in an antenna port indication field;

or, a code point in any indication field other than an antenna port indication field. There may be other information fields, which are not limited in the embodiments of the disclosure.

The newly added indication field is a newly defined indication field in the DCI.

The code point in the antenna port indication field is a value taken from a sequence of bits consisting of one or more bits, for example, "001".

For example, the indication information is carried in the STRP and MTRP transmission switching dynamic indication field of the DCI signaling. In a case where a code point in the STRP and MTRP transmission switching dynamic indication field is a first value, the indication information indicates an STRP transmission and the Type-1 layer mapping scheme. In a case where a code point in the STRP and MTRP transmission switching dynamic indication field is a second value, the indication information indicates an MTRP transmission and the Type-2 layer mapping scheme.

For example, the indication information is carried in the STRP and MTRP transmission switching dynamic indication field of the DCI signaling. In a case where the code point in the STRP and MTRP transmission switching dynamic indication field is "00" or "01", the indication information indicates the STRP transmission and the Type-1 layer mapping scheme. For example, when the code point in the STRP and MTRP transmission switching dynamic indication field is "00", the indication information indicates the STRP transmission sent by a TRP1; when the code point in the STRP and MTRP transmission switching dynamic indication field is "01", the indication information indicates the STRP transmission sent by a TRP2. When the code point in the STRP and MTRP transmission switching dynamic indication field is "10" or "11", the indication information indicate the MTRP transmission and the Type-2 layer mapping scheme. For example, when the code point in the STRP and MTRP transmission switching dynamic indication field is "10", the indication information indicates the MTRP transmission sent by a TRP1 and a TRP2, e.g., a sending sequence is TRP1-TRP2; when the code point in the STRP and MTRP transmission switching dynamic indication field is "11", the indication information indicates the MTRP transmission sent by a TRP1 and a TRP2, e.g., a sending sequence is TRP2-TRP1.

At step 1104, the target layer mapping scheme is determined and enabled according to the indication information.

For example, the terminal determines and enables the target layer mapping scheme according to the indication information. That is, the terminal determines and enables the Type-1 layer mapping scheme according to the indication information, or the terminal determines and enables any mapping scheme in the Type-2 layer mapping scheme according to the indication information, or the terminal determines and enables the Type-2 layer mapping scheme according to the indication information.

Optionally, the Type-2 layer mapping scheme includes at least one of the following cases:

supporting to transmit the two CWs for a transmission with 5 to 8 transport layers;

or, supporting to transmit the two CWs for a transmission with 4 or more transport layers;

or, supporting to transmit the two CWs for a transmission with 2 or more transport layers.

For example, the terminal receives the indication information sent by the network device, in which "00" in the indication information represents the Type-2, "01" in the indication information represents 5-8 transport layers, "10" in the indication information represents 4 or more transport layers, and "11" in the indication information represents 2 or more transport layers. The terminal determines and enables the target layer mapping scheme according to the indication information.

For example, the two CWs include a first CW and a second CW, the first CW corresponds to a first number of layers after layer mapping, and the second CW corresponds to a second number of layers after layer mapping. With the Type-2 layer mapping scheme, the maximum value of the difference between the first number of layers and the second number of layers is any value from 0 to 6.

Optionally, with the Type-2 layer mapping scheme, the difference between the first number of layers and the second number of layers may be any integer from 0 to 6. That is, the difference between the first number of layers and the second number of layers may be 0 or 1, which is not limited in the embodiments of the disclosure.

In conclusion, the technical solutions provided by the embodiments of the disclosure show that the terminal determines and enables the Type-1 layer mapping scheme or the Type-2 layer mapping scheme according to the indication information, and introduce a location where the indication information is carried. The technical solutions provided in the embodiments of the disclosure allows the terminal to select different layer mapping schemes according to the indication information to achieve flexible scheduling, so that the quality of data transmission between the terminal and the network device can be guaranteed even in the case of a larger interlayer channel performance difference.

The terminal reports its capability information, and determines and enables the target layer mapping scheme according to the indication information.

Figure 12:
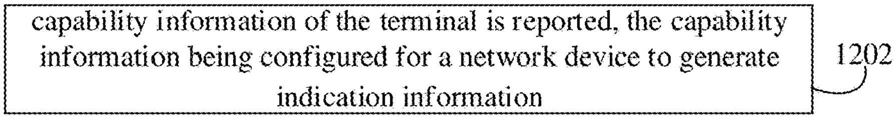
FIG. 12 is a flowchart of a method for indicating layer mapping of a CW according to an exemplary embodiment of the disclosure.

FIG. 12 is a flowchart of a method for indicating layer mapping of a CW according to an exemplary embodiment of the disclosure. In the embodiment, the method is applied to a terminal. The method includes the following step.

At step 1202, capability information of the terminal is reported, the capability information being configured for a network device to generate indication information.

For example, the capability information is configured to indicate supporting the Type-2 layer mapping scheme.

For example, the capability information may indicate that the Type-2 layer mapping scheme is supported to be enabled for the terminal transmission, or indicate the Type-2 layer mapping scheme is supported to be enabled for different layer transmission of the terminal. The disclosure does not make any restrictive provisions on the description dimension of the capability information. In a possible implementation, the terminal reports the capability information of the terminal. The capability information of the terminal is configured for the network device to generate the indication information.

Optionally, the Type-2 layer mapping scheme includes at least one of the following cases:

supporting to transmit the two CWs for a transmission with 5 to 8 transport layers;

or, supporting to transmit the two CWs for a transmission with 4 or more transport layers;

or, supporting to transmit the two CWs for a transmission with 2 or more transport layers.

For example, the capability information is configured to indicate that Type-2 layer mapping scheme is supported to be enabled. In detail, the capability information includes but is not limited to any of the following:

the capability information is configured to indicate that the Type-2 layer mapping scheme is supported to be enabled for the transmission with 5 to 8 transport layers, supporting to transmit the two CWs for a transmission with more than 5 layers;

for example, when the Type-2 layer mapping scheme is enabled for transmission with 6 layers, the transmission with 6 layers supports the two CWs. The first number of layers corresponding to the first CW of the two CWs after layer mapping is 4, and the second number of layers corresponding to the second CW of the two CWs after layer mapping is 2. The difference between the first number of layers and the second number of layers is 2. That is, with the Type-2 layer mapping scheme, the maximum value of the difference between the first number of layers and the second number of layers is any value from 0 to 6.

the capability information is configured to indicate that the Type-2 layer mapping scheme is supported to be enabled for the transmission with 4 or more layers, supporting to transmit the two CWs for the transmission with 4 or more layers.

It should be noted that the capability information is configured to indicate that the Type-2 layer mapping scheme is supported to be enabled for the transmission with 4 or more layers, which includes the Type-2 layer mapping scheme is supported to be enabled for the transmission with 4 layers. In this case, 4 or more includes 4.

For example, when the Type-2 layer mapping scheme is enabled for the transmission with 4 layers, the transmission with 4 layers supports the two CWs. The first number of layers corresponding to the first CW of the two CWs after layer mapping is 3, and the second number of layers corresponding to the second CW of the two CWs after layer mapping is 1. The difference between the first number of layers and the second number of layers is 2. That is, with the Type-2 layer mapping scheme, the maximum value of the difference between the first number of layers and the second number of layers is any value from 0 to 6.

the capability information is configured to indicate that the Type-2 layer mapping scheme is supported to be enabled for the transmission with 2 or more layers, supporting to transmit the two CWs for the transmission with 2 or more layers.

It should be noted that the capability information is configured to indicate that the Type-2 layer mapping scheme is supported to be enabled for the transmission with 2 or more layers, which includes the Type-2 layer mapping scheme is supported to be enabled for the transmission with 2 layers, that is, 2 or more layers include 2 layers.

For example, when the Type-2 layer mapping scheme is enabled for transmission with 2 layers, the transmission with 2 layers supports the two CWs. The first number of layers corresponding to the first CW of the two CWs after layer mapping is 2, and the second number of layers corresponding to the second CW of the two CWs after layer mapping is 0. The difference between the first number of layers and the second number of layers is 2. That is, with the Type-2 layer mapping scheme, the maximum value of the difference between the first number of layers and the second number of layers is any value from 0 to 6.

In conclusion, the technical solutions provided by the embodiments of the disclosure show that the terminal reports its capability information to the network device, the network device determines the indication information according to the capability information, and the terminal determines and enables the Type-1 layer mapping scheme or the Type-2 layer mapping scheme according to the indication information. In the technical solutions provided in the embodiments of the disclosure, the network device sends the indication information to the terminal according to the capability information reported by the terminal. The terminal selects different layer mapping schemes according to the indication information to achieve flexible scheduling, so that the quality of data transmission between the terminal and the network device can be guaranteed even in the case of a larger interlayer channel performance difference.

The above embodiments introduces the method for indicating layer mapping of a CW executed by the terminal, and the method for indicating layer mapping of a CW executed by a network device will be further described below.

The network device sends indication information to indicate the terminal to determine and enable the target layer mapping scheme.

Figure 13:
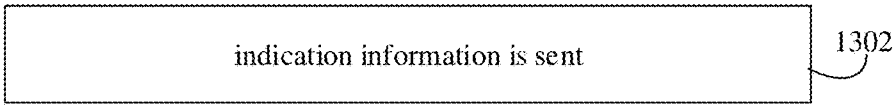
FIG. 13 is a flowchart of a method for indicating layer mapping of a CW according to an exemplary embodiment of the disclosure.

FIG. 13 is a flowchart of a method for indicating layer mapping of a CW according to an exemplary embodiment of the disclosure. In the embodiment, the method is applied to a network device. The method includes the following step.

At step 1302, indication information is sent.

For example, the network device sends the indication information to the terminal. The indication information is configured to indicate the terminal to determine and enable a target mapping scheme.

The target layer mapping scheme is a Type-1 layer mapping scheme or a Type-2 layer mapping scheme.

A maximum value of difference between numbers of layers corresponding to two CWs after layer mapping based on the Type-1 layer mapping scheme is different from a maximum value of difference between numbers of layers corresponding to the two CWs after layer mapping based on the Type-2 layer mapping scheme. For example, the two CWs include a first CW and a second CW, the first CW corresponds to a first number of layers after layer mapping, and the second CW corresponds to a second number of layers after layer mapping;

with the Type-1 layer mapping scheme, the difference between the first number of layers and the second number of layers is 0 or 1; and with the Type-2 layer mapping scheme, the maximum value of the difference between the first number of layers and the second number of layers may be any value from 0 to 6.

For example, in the uplink, two CWs correspond to a maximum of 8 transport layers. In the embodiment, 8 transport layers are illustrated herein as an example, in the case where the network device instructs the terminal to determine and enable the Type-1 layer mapping scheme through the indication information, the first CW is mapped to layers 1 to 4, and the second CW is mapped to layers 5 to 8. That is, the first CW is allocated to layers 1 to 4, and the second CW is allocated to layers 5 to 8, and each of the CWs is mapped to 4 transport layers, and the difference between the numbers of layers corresponding to the two CWs is 0.

In the case where the network device instructs the terminal to determine and enable the Type-2 layer mapping scheme through the indication information, the first CW is mapped to layers 1 to 2, and the second CW is mapped to layers 3 to 8. That is, the first CW is allocated to layers 1 to 2, and the second CW is allocated to layers 3 to 8, the first CW is mapped to 2 transport layers, the second CW is mapped to 6 transport layers, and the difference between the numbers of layers corresponding to the two CWs is 4.

In a possible implementation, the network device sends the indication information to the terminal. The indication information is carried in at least one of the following signaling:

a RRC signaling;

a MAC CE signaling;

a DCI signaling; or a GC-DCI signaling. There may be other kinds of signaling, which is not limited in the embodiments of the disclosure.

For example, the terminal enables the Type-1 layer mapping scheme by default, and the network device configures the Type-2 layer mapping scheme via the RRC signaling;

or, the network device configures/updates a physical uplink shared channel (PUSCH) of the terminal to indicate whether to adopt the Type-2 layer mapping scheme subsequently through the MAC CE signaling;

or, the network device associates an STRP and MTRP transmission switching dynamic indication field of the DCI signaling by default, the Type-1 layer mapping scheme is adopted for STRP, and the Type-2 layer mapping scheme is adopted for MTRP;

or, an independent indication field is newly added in the DCI;

or, the amount of information is increased for the code point in the antenna port indication field to indicate the terminal to determine and enable the layer mapping scheme;

or, the code points in other indication fields except the antenna port indication field may extend the indication field when necessary.

In a possible implementation, the network device sends the indication information to the terminal. If the indication information is carried in the DCI signaling or GC-DCI signaling, the indication information is carried in at least one of the following information fields of the DCI signaling or GC-DCI signaling:

an STRP and MTRP transmission switching dynamic indication field;

or, a newly added indication field;

or, a code point in an antenna port indication field;

or, a code point in any indication field other than the antenna port indication field. There may be other information fields, which are not limited in the embodiments of the disclosure.

The newly added indication field is a newly defined indication field in the DCI.

The code point in the antenna port indication field is a value taken from a sequence of bits consisting of one or more bits, for example, "001".

For example, the indication information is carried in the STRP and MTRP transmission switching dynamic indication field of the DCI signaling. In a case where a code point in the STRP and MTRP transmission switching dynamic indication field is a first value, the indication information indicates an STRP transmission and the Type-1 layer mapping scheme. In a case where a code point in the STRP and MTRP transmission switching dynamic indication field is a second value, the indication information indicates an MTRP transmission and the Type-2 layer mapping scheme.

For example, the indication information is carried in the STRP and MTRP transmission switching dynamic indication field of the DCI signaling. In a case where the code point in the STRP and MTRP transmission switching dynamic indication field is "00" or "01", the indication information indicates the STRP transmission and the Type-1 layer mapping scheme. When the code point in the STRP and MTRP transmission switching dynamic indication field is "10" or "11", the indication information indicate the MTRP transmission and the Type-2 layer mapping scheme.

For example, the network device instructs the terminal to determine and enable the target layer mapping scheme. That is, the network device instructs the terminal to determine and enable the Type-1 layer mapping scheme through the indication information, or the network device instructs the terminal to determine and enable any layer mapping scheme of Type-2 layer mapping scheme through the indication information, or the network device instructs the terminal to determine and enable the Type-2 layer mapping scheme through the indication information.

Optionally, the Type-2 layer mapping scheme includes at least one of the following conditions:

supporting to transmit the two CWs for a transmission with 5 to 8 transport layers;

or, supporting to transmit the two CWs for a transmission with 4 or more transport layers;

or, supporting to transmit the two CWs for a transmission with 2 or more transport layers.

For example, the network device sends the indication information to the terminal, in which "00" in the indication information represents the Type-2, "01" in the indication information represents 5-8 transport layers, "10" in the indication information represents 4 or more transport layers, and "11" in the indication information represents 2 or more transport layers. The terminal determines and enables the target layer mapping scheme according to the indication information.

For example, the two CWs include a first CW and a second CW, the first CW corresponds to a first number of layers after layer mapping, and the second CW corresponds to a second number of layers after layer mapping. With the Type-2 layer mapping scheme, the maximum value of the difference between the first number of layers and the second number of layers is any value from 0 to 6.

Optionally, with the Type-2 layer mapping scheme, the difference between the first number of layers and the second number of layers may be any integer from 0 to 6. That is, the difference between the first number of layers and the second number of layers may be 0 or 1, which is not limited in the embodiments of the disclosure.

In conclusion, the technical solutions provided in the embodiments of the disclosure show that the network device instructs the terminal to determine and enable the Type-1 layer mapping scheme or the Type-2 layer mapping scheme through the indication information, and introduce the location where the indication information is carried. The technical solutions provided in the embodiments of the disclosure allows the network device to instruct the terminal to determine and enable different layer mapping schemes through the indication information, so that the quality of data transmission between the terminal and the network device can be guaranteed even in the case of a larger interlayer channel performance difference.

The network device receives the capability information of the terminal reported by the terminal, and generates the indication information according to the capability information.

Figure 14:
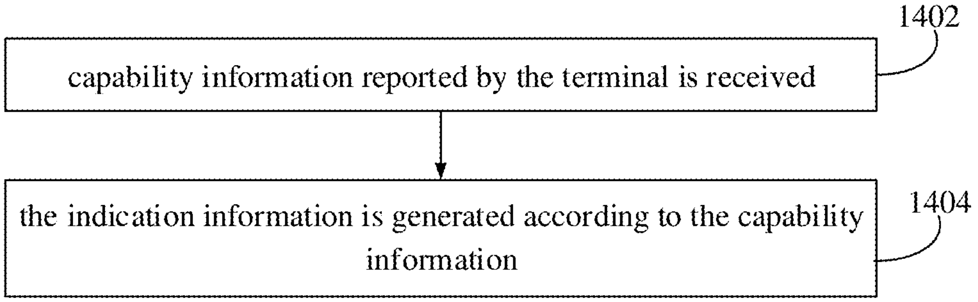
FIG. 14 is a flowchart of a method for indicating layer mapping of a CW according to an exemplary embodiment of the disclosure.

FIG. 14 is a flowchart of a method for indicating layer mapping of a CW according to an exemplary embodiment of the disclosure. In the embodiment, the method is applied to a network device. The method includes the following step.

At step 1402, capability information reported by the terminal is received.

For example, the capability information is configured to indicate support for using the Type-2 layer mapping scheme.

For example, the capability information may indicate that the Type-2 layer mapping scheme is supported to be enabled for the terminal transmission, or indicate the Type-2 layer mapping scheme is supported to be enabled for different layer transmission of the terminal. The disclosure does not make any restrictive provisions on the description dimension of the capability information.

At step 1404, the indication information is generated according to the capability information.

In a possible implementation, the network device receives the capability information of the terminal reported by the terminal, and the capability information of the terminal is configured for the network device to generate the indication information.

Optionally, the network device configures different layer mapping schemes according to the capability information reported by the terminal, and selects a specific layer mapping scheme through the MAC-CE/DCI.

Optionally, the Type-2 layer mapping scheme includes at least one of the following cases:

- supporting to transmit the two CWs for a transmission with 5 to 8 transport layers;
- or, supporting to transmit the two CWs for a transmission with 4 or more transport layers;
- or, supporting to transmit the two CWs for a transmission with 2 or more transport layers.

For example, the capability information is configured to indicate that Type-2 layer mapping scheme is supported to be enabled. In detail, the capability information includes but is not limited to any of the following:

- the capability information is configured to indicate that the Type-2 layer mapping scheme is supported to be enabled for the transmission with 5 to 8 transport layers, supporting to transmit the two CWs for a transmission with more than 5 layers;
- for example, when the Type-2 layer mapping scheme is enabled for transmission with 6 layers, the transmission with 6 layers supports the two CWs. The first number of layers corresponding to the first CW of the two CWs after layer mapping is 4, and the second number of layers corresponding to the second CW of the two CWs after layer mapping is 2. The difference between the first number of layers and the second number of layers is 2. That is, with the Type-2 layer mapping scheme, the maximum value of the difference between the first number of layers and the second number of layers is any value from 0 to 6.
- the capability information is configured to indicate that the Type-2 layer mapping scheme is supported to be enabled for the transmission with 4 or more layers, supporting to transmit the two CWs for the transmission with 4 or more layers.

It should be noted that the capability information is configured to indicate that the Type-2 layer mapping scheme is supported to be enabled for the transmission with 4 or more layers, which includes the Type-2 layer mapping scheme is supported to be enabled for the transmission with 4 layers. In this case, 4 or more includes 4.

For example, when the Type-2 layer mapping scheme is enabled for the transmission with 4 layers, the transmission with 4 layers supports the two CWs. The first number of layers corresponding to the first CW of the two CWs after layer mapping is 3, and the second number of layers corresponding to the second CW of the two CWs after layer mapping is 1. The difference between the first number of layers and the second number of layers is 2. That is, with the Type-2 layer mapping scheme, the maximum value of the difference between the first number of layers and the second number of layers is any value from 0 to 6.

- the capability information is configured to indicate that the Type-2 layer mapping scheme is supported to be enabled for the transmission with 2 or more layers, supporting to transmit the two CWs for the transmission with 2 or more layers.

It should be noted that the capability information is configured to indicate that the Type-2 layer mapping scheme is supported to be enabled for the transmission with 2 or more layers, which includes the Type-2 layer mapping scheme is supported to be enabled for the transmission with 2 layers, that is, 2 or more layers include 2 layers.

For example, when the Type-2 layer mapping scheme is enabled for transmission with 2 layers, the transmission with 2 layers supports the two CWs. The first number of layers corresponding to the first CW of the two CWs after layer mapping is 2, and the second number of layers corresponding to the second CW of the two CWs after layer mapping is 0. The difference between the first number of layers and the second number of layers is 2. That is, with the Type-2 layer mapping scheme, the maximum value of the difference between the first number of layers and the second number of layers is any value from 0 to 6.

In conclusion, the technical solutions provided in the embodiments of the disclosure show that the network device receives the capability information of the terminal reported by the terminal, and the network device generates the indication information according to the capability information. In the technical solutions provided in the embodiments of the disclosure, the network device can receive the capability information reported by the terminal, generates the indication information according to the capability information reported by the terminal, and instruct the terminal to select different layer mapping schemes to achieve flexible scheduling, so that the quality of data transmission between the terminal and the network device can be guaranteed even in the case of a larger interlayer channel performance difference.

Figure 15:
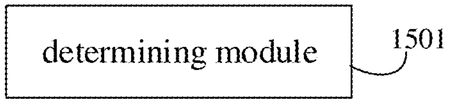
FIG. 15 is a schematic diagram of an apparatus for indicating layer mapping of a CW according to an exemplary embodiment of the disclosure.

FIG. 15 is a schematic diagram of an apparatus for indicating layer mapping of a CW according to an exemplary embodiment of the disclosure. The apparatus includes:

a determining module 1501, configured to determine and enable a target layer mapping scheme, in which the target layer mapping scheme is a Type-1 layer mapping scheme or a Type-2 layer mapping scheme;

in which a maximum value of difference between numbers of layers corresponding to two CWs after layer mapping based on the Type-1 layer mapping scheme is different from a maximum value of difference between numbers of layers corresponding to the two CWs after layer mapping based on the Type-2 layer mapping scheme.

The two CWs include a first CW and a second CW, the first CW corresponds to a first number of layers after layer mapping, and the second CW corresponds to a second number of layers after layer mapping;

with the Type-1 layer mapping scheme, the difference between the first number of layers and the second number of layers is 0 or 1; and with the Type-2 layer mapping scheme, the maximum value of the difference between the first number of layers and the second number of layers may be any value from 0 to 6.

In a possible implementation, determining and enabling the target layer mapping scheme, includes at least one of the following:

enabling the Type-1 layer mapping scheme by default;

enabling the Type-2 layer mapping scheme by default;

in a case where the terminal supports the Type-2 layer mapping scheme, enabling the Type-2 layer mapping scheme;

for an STRP transmission, enabling the Type-1 layer mapping scheme;

for an STRP transmission with a total number of layers ranging from 1 to 4, enabling the Type-1 layer mapping scheme; and for an STRP transmission with a total number of layers ranging from 5 to 8, enabling the Type-2 layer mapping scheme;

for an STRP transmission with a total number of layers of 1, enabling the Type-1 layer mapping scheme; and for an STRP transmission with a total number of layers ranging from 2 to 8, enabling the Type-2 layer mapping scheme; or for an MTRP transmission, enabling the Type-2 layer mapping scheme.

In a possible implementation, the determining module 1501 is configured to: receive indication information; and determine and enable the target layer mapping scheme according to the indication information.

In a possible implementation, the determining module 1501 is configured to: determine and enable the Type-1 layer mapping scheme according to the indication information; or, determine and enable any layer mapping scheme in the Type-2 layer mapping scheme according to the indication information; or, determine and enable the Type-2 layer mapping scheme according to the indication information.

For example, the indication information is carried in at least one of the following signaling:

a RRC signaling;

a MAC CE signaling;

a DCI signaling; or a GC-DCI signaling.

For example, the indication information is carried in the following information fields of the DCI signaling or GC-DCI signaling:

in STRP and MTRP transmission switching dynamic indication field, indicating an STRP transmission and the Type-1 layer mapping scheme in a case where a code point in the STRP and MTRP transmission switching dynamic indication field is a first value, and indicating an MTRP transmission and the Type-2 layer mapping scheme in a case where a code point in the STRP and MTRP transmission switching dynamic indication field is a second value;

or, a newly added indication field;

or, a code point in an antenna port indication field;

or, a code point in any indication field other than an antenna port indication field.

In a possible implementation, the determining module 1501 is configured to: report capability information of the terminal, the capability information being configured for a network device to generate the indication information.

The Type-2 layer mapping scheme includes:

supporting to transmit the two CWs for a transmission with 5 to 8 transport layers;

or, supporting to transmit the two CWs for a transmission with 4 or more transport layers;

or, supporting to transmit the two CWs for a transmission with 2 or more transport layers.

Figure 16:
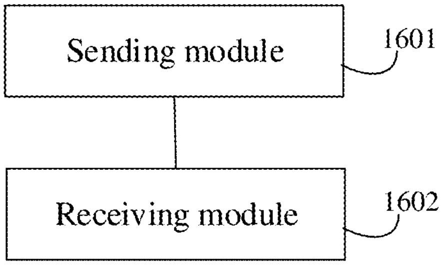
FIG. 16 is a schematic diagram of an apparatus for indicating layer mapping of a CW according to an exemplary embodiment of the disclosure.

FIG. 16 is a schematic diagram of an apparatus for indicating layer mapping of a CW according to an exemplary embodiment of the disclosure. The apparatus includes:

a sending module 1601, configured to send indication information, in which the indication information is configured to indicate a terminal to determine and enable a target layer mapping scheme, and the target layer mapping scheme is a Type-1 layer mapping scheme or a Type-2 layer mapping scheme;

in which a maximum value of difference between numbers of layers corresponding to two CWs after layer mapping based on the Type-1 layer mapping scheme is different from a maximum value of difference between numbers of layers corresponding to the two CWs after layer mapping based on the Type-2 layer mapping scheme.

For example, the two CWs include a first CW and a second CW, the first CW corresponds to a first number of layers after layer mapping, and the second CW corresponds to a second number of layers after layer mapping;

with the Type-1 layer mapping scheme, the difference between the first number of layers and the second number of layers is 0 or 1; and with the Type-2 layer mapping scheme, the maximum value of the difference between the first number of layers and the second number of layers is any value from 0 to 6.

In a possible implementation, the sending module 1601 is configured to: indicate the terminal to determine and enable the Type-1 layer mapping scheme; or, indicate the terminal to determine and enable e any layer mapping scheme in the Type-2 layer mapping scheme; or, indicate the terminal to determine and enable the Type-2 layer mapping scheme.

The indication information is carried in at least one of the following signaling:

a RRC signaling;

a MAC CE signaling;

a DCI signaling; or a GC-DCI signaling.

The indication information is carried in the following information fields of the DCI signaling or GC-DCI signaling:

an STRP and MTRP transmission switching dynamic indication field, indicating an STRP transmission and the Type-1 layer mapping scheme in a case where a code point in the STRP and MTRP transmission switching dynamic indication field is a first value; and indicating an MTRP transmission and the Type-2 layer mapping scheme in a case where a code point in the STRP and MTRP transmission switching dynamic indication field is a second value;

or, a newly added indication field;

or, a code point in an antenna port indication field;

or, a code point in any indication field other than the antenna port indication field.

In a possible implementation, a receiving module 1602 is configured to: receive capability information reported by the terminal; and generate the indication information according to the capability information.

The Type-2 layer mapping scheme includes:

supporting to transmit the two CWs for a transmission with 5 to 8 transport layers;

or, supporting to transmit the two CWs for a transmission with 4 or more transport layers;

or, supporting to transmit the two CWs for a transmission with 2 or more transport layers.

Figure 17:
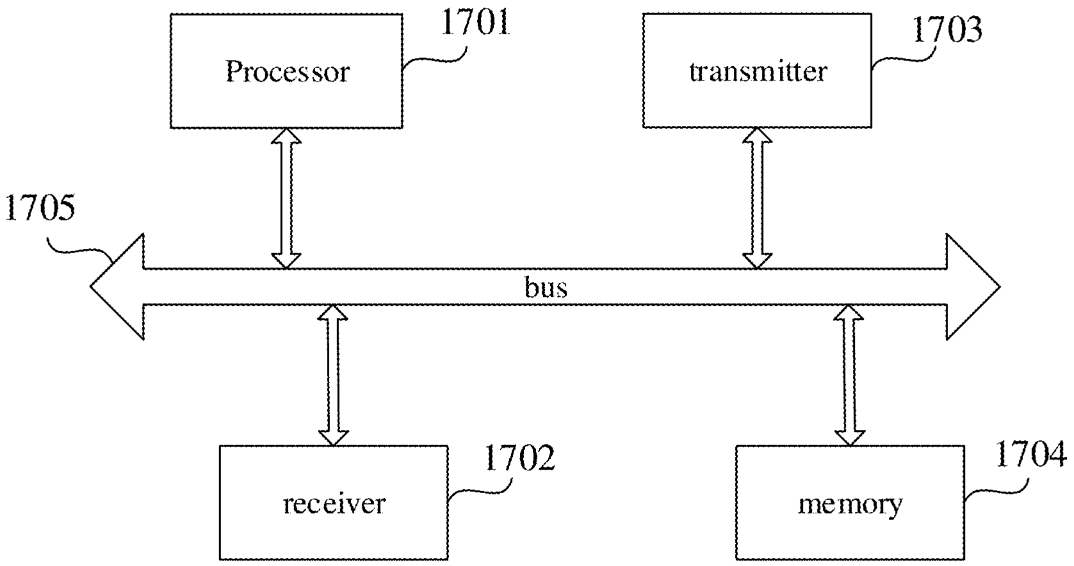
FIG. 17 is a block diagram of a communication device according to an exemplary embodiment of the disclosure.

FIG. 17 illustrates a schematic diagram of a communication device (terminal or network device) according to an exemplary embodiment of the disclosure. The communication device includes: a processor 1701, a receiver 1702, a transmitter 1703, a memory 1704, and a bus 1705.

The processor 1701 includes one or more processing cores, and is able to perform various functional applications as well as information processing by running software programs and modules.

The receiver 1702 and the transmitter 1703 may be realized as a communication component, which may be a communication chip.

The memory 1704 is connected to the processor 1701 via the bus 1705.

The memory 1704 is configured for storing at least one instruction. The processor 1701 is configured for executing the at least one instruction to realize the steps of the methods for indicating layer mapping of the CW described in the above method embodiments.

The memory 1704 may be implemented by any type of volatile or nonvolatile storage device or a combination thereof. The volatile or nonvolatile storage device includes, but is not limited to, a magnetic disk or optical disk, an electrically erasable programmable read-only memory (EEPROM), an erasable programmable read-only memory (EPROM), a static random access memory (SRAM), a read-only memory (ROM), a magnetic memory, a flash memory, and a programmable ROM (PROM).

According to an aspect of the disclosure, a terminal device including a processor, a transceiver connected to the processor, and a memory for storing executable instructions of the processor is provided. The processor is configured to load and execute the executable instructions to implement the method for indicating layer mapping of the CW as described above.

According to an aspect of the disclosure, a network device including a processor, a transceiver connected to the processor, and a memory for storing executable instructions of the processor is provided. The processor is configured to load and execute the executable instructions to implement the method for indicating layer mapping of the CW as described above.

According to an aspect of the disclosure, a chip including a programmable logic circuit and/or programs is provided. The chip is used to implement the method for indicating layer mapping of the CW as described above.

According to an exemplary embodiment of the disclosure, a computer readable storage medium having executable instructions stored thereon is provided. The executable instructions are loaded and executed by the processor to implement the method for indicating layer mapping of the CW as described above.

According to an exemplary embodiment of the disclosure, a computer program product having executable instructions stored thereon is provided. The executable instructions are loaded and executed by the processor to implement the method for indicating layer mapping of the CW as described above.

Those skilled in the art understand that all or some of the steps for realizing the above embodiments may be accomplished by hardware, or may be accomplished by relevant hardware instructed by a program. The program may be stored in a computer-readable storage medium, and the storage medium referred to above may be a ROM, a magnetic disk, or a CD-ROM, and the like.

The foregoing are only optional embodiments of the disclosure and are not intended to limit the disclosure. Any modifications, equivalent substitutions, improvements, etc. made within the spirit and principles of the disclosure shall be included in the scope of protection of the disclosure.

The invention claimed is:

1. A method for indicating layer mapping of a code word (CW), performed by a terminal, comprising:

determining and enabling a target layer mapping scheme, wherein the target layer mapping scheme comprises a Type-1 layer mapping scheme or a Type-2-layer mapping scheme;

wherein a maximum value of difference between numbers of layers corresponding to two CWs after layer mapping based on the Type-1 layer mapping scheme is different from a maximum value of difference between numbers of layers corresponding to the two CWs after layer mapping based on the Type-2-layer mapping scheme;

wherein determining and enabling the target layer mapping scheme comprises:

enabling the Type-1 layer mapping scheme by default;

enabling the Type-2 layer mapping scheme by default;

where the terminal supports the Type-2 layer mapping scheme, enabling the Type-2 layer mapping scheme;

for a single transmission and reception point (STRP) transmission, enabling the Type-1 layer mapping scheme;

for an STRP transmission with a total number of layers ranging from 1 to 4, enabling the Type-1 layer mapping scheme; and for an STRP transmission with a total number of layers ranging from 5 to 8, enabling the Type-2 layer mapping scheme;

for an STRP transmission with a total number of layers of 1, enabling the Type-1 layer mapping scheme; and for an STRP transmission with a total number of layers ranging from 2 to 8, enabling the Type-2 layer mapping scheme;

for a multi-transmission and reception point (MTRP) transmission, enabling the Type-2 layer mapping scheme.

2. The method of claim 1, wherein the two CWs comprise a first CW and a second CW, the first CW after the layer mapping corresponds to a first number of layers, and the second CW after the layer mapping corresponds to a second number of layers;

with the Type-1 layer mapping scheme, the difference between the first number of layers and the second number of layers is 0 or 1; and with the Type-2 layer mapping scheme, the maximum value of the difference between the first number of layers and the second number of layers is any value from 0 to 6.

3. The method of claim 1, wherein determining and enabling the target layer mapping scheme, comprises:

receiving indication information; and determining and enabling the target layer mapping scheme according to the indication information.

4. The method of claim 3, wherein determining and enabling the target layer mapping scheme according to the indication information, comprises:

determining and enabling the Type-1 layer mapping scheme according to the indication information;

or, determining and enabling any layer mapping scheme in the Type-2 layer mapping scheme according to the indication information;

or, determining and enabling the Type-2 layer mapping scheme according to the indication information.

5. The method of claim 3, wherein the indication information is carried in at least one of:

a radio resource control (RRC) signaling;

a media access control control element (MAC CE) signaling;

a downlink control information (DCI) signaling; or a group control-DCI (GC-DCI) signaling.

6. The method of claim 5, wherein the indication information is carried in the following information fields of the DCI signaling or the GC-DCI signaling:

an STRP and MTRP transmission switching dynamic indication field, indicating an STRP transmission and the Type-1 layer mapping scheme in a case where a code point in the STRP and MTRP transmission switching dynamic indication field is a first value, or indicating an MTRP transmission and the Type-2 layer mapping scheme in a case where a code point in the STRP and MTRP transmission switching dynamic indication field is a second value;

or, a newly added indication field;

or, a code point in an antenna port indication field;

or, a code point in any indication field other than an antenna port indication field.

7. The method of claim 3, further comprising:

reporting capability information of the terminal, the capability information being configured for a network device to generate the indication information.

8. The method of claim 1, wherein the Type-2 layer mapping scheme comprises:

supporting to transmit the two CWs for a transmission with 5 to 8 transport layers;

or, supporting to transmit the two CWs for a transmission with 4 or more transport layers;

or, supporting to transmit the two CWs for a transmission with 2 or more transport layers.

9. A method for indicating layer mapping of a code word (CW), performed by a network device, comprising:

sending indication information, wherein the indication information is configured to indicate a terminal to determine and enable a target layer mapping scheme, and the target layer mapping scheme comprises a Type-1 layer mapping scheme or a Type-2 layer mapping scheme;

wherein a maximum value of difference between numbers of layers corresponding to two CWs after layer mapping based on the Type-1 layer mapping scheme is different from a maximum value of difference between numbers of layers corresponding to the two CWs after layer mapping based on the Type-2 layer mapping scheme;

wherein determining and enabling the target layer mapping scheme comprises:

enabling the Type-1 layer mapping scheme by default;

enabling the Type-2 layer mapping scheme by default;

where the terminal supports the Type-2 layer mapping scheme, enabling the Type-2 layer mapping scheme;

for a single transmission and reception point (STRP) transmission, enabling the Type-1 layer mapping scheme;

for an STRP transmission with a total number of layers ranging from 1 to 4, enabling the Type-1 layer mapping scheme; and for an STRP transmission with a total number of layers ranging from 5 to 8, enabling the Type-2 layer mapping scheme;

for an STRP transmission with a total number of layers of 1, enabling the Type-1 layer mapping scheme; and for an STRP transmission with a total number of layers ranging from 2 to 8, enabling the Type-2 layer mapping scheme;

for a multi-transmission and reception point (MTRP) transmission, enabling the Type-2 layer mapping scheme.

10. The method of claim 9, wherein the two CWs comprise a first CW and a second CW, the first CW, after the layer mapping, corresponds to a first number of layers, and the second CW, after the layer mapping, corresponds to a second number of layers;

with the Type-1 layer mapping scheme, the difference between the first number of layers and the second number of layers is 0 or 1; and with the Type-2 layer mapping scheme, the maximum value of the difference between the first number of layers and the second number of layers is any value from 0 to 6.

11. The method of claim 9, wherein indicating the terminal to determine and enable the target layer mapping scheme according to the indication information, comprises:

indicating the terminal to determine and enable the Type-1 layer mapping scheme;

or, indicating the terminal to determine and enable any layer mapping scheme in the Type-2 layer mapping scheme;

or, indicating the terminal to determine and enable the Type-2 layer mapping scheme.

12. The method of claim 11, wherein the indication information is carried in at least one of:

a radio resource control (RRC) signaling;

a media access control control element (MAC CE) signaling;

a downlink control information (DCI) signaling; or a group control-DCI (GC-DCI) signaling.

13. The method of claim 12, wherein the indication information is carried in the following information fields of the DCI signaling or GC-DCI signaling:

an STRP and MTRP transmission switching dynamic indication field, indicating an STRP transmission and the Type-1 layer mapping scheme in a case where a code point in the STRP and MTRP transmission switching dynamic indication field is a first value; or indicating an MTRP transmission and the Type-2 layer mapping scheme in a case where a code point in the STRP and MTRP transmission switching dynamic indication field is a second value;

or, a newly added indication field;

or, a code point in an antenna port indication field;

or, a code point in any indication field other than an antenna port indication field.

14. The method of claim 9, further comprising:

receiving capability information reported by the terminal; and generating the indication information according to the capability information.

15. The method of claim 9, wherein the Type-2 layer mapping scheme comprises:

supporting to transmit the two CWs for a transmission with 5 to 8 transport layers;

or, supporting to transmit the two CWs for a transmission with 4 or more transport layers;

or, supporting to transmit the two CWs for a transmission with 2 or more transport layers.

16. A terminal device comprising:

a processor, a transceiver connected to the processor, and a memory for storing instructions executable by the processor, wherein the processor is configured to load and execute the executable instructions to implement a method for indicating layer mapping of a code word (CW), and the method comprises:

determining and enabling a target layer mapping scheme, wherein the target layer mapping scheme comprises a Type-1 layer mapping scheme or a Type-2 layer mapping scheme;

wherein a maximum value of difference between numbers of layers corresponding to two CWs after layer mapping based on the Type-1 layer mapping scheme is different from a maximum value of difference between numbers of layers corresponding to the two CWs after layer mapping based on the Type-2 layer mapping scheme;

wherein determining and enabling the target layer mapping scheme comprises:

enabling the Type-1 layer mapping scheme by default;

enabling the Type-2 layer mapping scheme by default;

where the terminal supports the Type-2 layer mapping scheme, enabling the Type-2 layer mapping scheme;

for a single transmission and reception point (STRP) transmission, enabling the Type-1 layer mapping scheme;

for an STRP transmission with a total number of layers ranging from 1 to 4, enabling the Type-1 layer mapping scheme; and for an STRP transmission with a total number of layers ranging from 5 to 8, enabling the Type-2 layer mapping scheme;

for an STRP transmission with a total number of layers of 1,enabling the Type-1 layer mapping scheme; and for an STRP transmission with a total number of layers ranging from 2 to 8, enabling the Type-2 layer mapping scheme;

for a multi-transmission and reception point (MTRP) transmission. enabling the Type-2 layer mapping scheme.

17. A network device comprising: a processor, a transceiver connected to the processor, and a memory for storing instructions executable by the processor, wherein the processor is configured to load and execute the executable instructions to implement the method for indicating layer mapping of the CW of claim 9.

18. A non-transitory computer-readable storage medium having executable instructions stored thereon, wherein the executable instructions are loaded and executed by a processor to implement the method for indicating layer mapping of the CW of claim 1.

19. A non-transitory computer-readable storage medium having executable instructions stored thereon, wherein the executable instructions are loaded and executed by a processor to implement the method for indicating layer mapping of the CW of claim 9.

* * * * *